United States Patent
Zhao et al.

(10) Patent No.: US 10,891,158 B2
(45) Date of Patent: Jan. 12, 2021

(54) TASK SCHEDULING METHOD AND APPARATUS

(71) Applicant: Huawei Technologies Co., Ltd., Shenzhen (CN)

(72) Inventors: Peng Zhao, Beijing (CN); Lei Liu, Beijing (CN); Wei Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 16/145,607

(22) Filed: Sep. 28, 2018

(65) Prior Publication Data

US 2019/0034230 A1    Jan. 31, 2019

Related U.S. Application Data

(63) Continuation of application No. PCT/CN2016/102055, filed on Oct. 13, 2016.

(30) Foreign Application Priority Data

Mar. 29, 2016 (CN) .......................... 2016 1 0188139

(51) Int. Cl.
  *G06F 9/48* (2006.01)
(52) U.S. Cl.
  CPC ................................. *G06F 9/4881* (2013.01)
(58) Field of Classification Search
  CPC .................................................... G06F 9/4881
  USPC ....................................................... 718/102
  See application file for complete search history.

(56) References Cited

U.S. PATENT DOCUMENTS

| | | | |
|---|---|---|---|
| 8,549,524 B2* | 10/2013 | Jula ....................... | G06F 9/4881 718/100 |
| 2002/0023118 A1 | 2/2002 | Peled et al. | |
| 2005/0125793 A1 | 6/2005 | Aguilar, Jr. et al. | |
| 2011/0296212 A1* | 12/2011 | Elnozahy .............. | G06F 1/3203 713/320 |
| 2011/0321059 A1* | 12/2011 | Yildiz ................... | G06F 9/4843 718/107 |
| 2012/0159495 A1 | 6/2012 | Rajagopalan et al. | |
| 2012/0173906 A1* | 7/2012 | Elnozahy .............. | G06F 1/3203 713/320 |

(Continued)

FOREIGN PATENT DOCUMENTS

| CN | 101005486 A | 7/2007 |
|---|---|---|
| CN | 102541653 A | 7/2012 |
| CN | 102902573 A | 1/2013 |

(Continued)

*Primary Examiner* — John Q Chavis

(74) *Attorney, Agent, or Firm* — Leydig, Voit & Mayer, Ltd.

(57) ABSTRACT

Data contention caused by multiple threads accessing one data block at the same time when used to execute tasks concurrently may be avoided, and difficulty in detecting and debugging a concurrent error may be reduced. A solution is: adding, according to correspondences between multiple tasks and M data blocks that are accessed by the multiple tasks, each of the multiple tasks to a task queue of a data block corresponding to the task; using N threads to execute tasks in N task queues of M task queues concurrently, where each of the N threads executes a task in a task queue of the N task queues, different threads of the N threads execute tasks in different task queues, and $2 \leq N \leq M$.

20 Claims, 8 Drawing Sheets

(56) References Cited

U.S. PATENT DOCUMENTS

2015/0135183 A1   5/2015  Kipp

FOREIGN PATENT DOCUMENTS

| CN | 103955491 A | 7/2014 |
| CN | 104375882 A | 2/2015 |
| CN | 104899099 A | 9/2015 |
| CN | 105893126 A | 8/2016 |
| WO | 2015070789 A1 | 5/2015 |

* cited by examiner

TASK SCHEDULING METHOD AND APPARATUS

CROSS-REFERENCE TO RELATED APPLICATIONS

This application is a continuation of International Application No. PCT/CN2016/102055, filed on Oct. 13, 2016, which claims priority to Chinese Patent Application No. 201610188139.2, filed on Mar. 29, 2016. The disclosures of the aforementioned applications are hereby incorporated by reference in their entireties.

TECHNICAL FIELD

The present disclosure relates to the field of computer technologies, and in particular, to a task scheduling method and apparatus.

BACKGROUND

With development of a processor technology, a multi-core processor is increasingly widely used. On the market, most processors use a multi-core and multithreaded architecture. Even multiple processors configured on terminals may have four cores or even eight cores.

Streaming application is a common application type. When the foregoing multi-core processor is used to process application data of the streaming application, to make full use of a concurrent processing capability of the multi-core processor, the application data of the streaming application may be divided into multiple data blocks, and the multi-core processor processes the multiple data blocks concurrently. In a concurrent processing process of the multi-core processor, because at least two threads are used to execute tasks concurrently, the at least two threads may access one data block at the same time, causing data contention.

In the prior art, to avoid the data contention, a "lock" is introduced into the concurrent processing process of the multi-core processor. Before accessing a data block, a thread needs to obtain a lock of the data block; and needs to release the lock of the data block after the access is completed. In this case, in a process in which a thread accesses the data block, another thread cannot access the data block at the same time. Therefore, data contention caused by multiple threads accessing one data block at the same time when the multiple threads are used to execute tasks concurrently may be avoided.

However, the following problem exists: After the "lock" is introduced into the concurrent processing process of the multi-core processor, when used to execute tasks concurrently, multiple threads accessing one data block at the same time may be avoided. However, the multiple threads still contend for a lock of one data block in a process in which the multiple threads are used to execute the tasks concurrently, and contention for a lock brings extra performance overheads.

SUMMARY

Embodiments of the present disclosure provide a task scheduling method and apparatus, so as to reduce data contention caused by multiple threads accessing one data block at the same time when used to execute tasks concurrently, thereby improving task scheduling efficiency.

To achieve the foregoing objective, the following technical solutions are used in the embodiments of the present disclosure:

According to a first aspect of embodiments of the present disclosure, a task scheduling method is provided. The task scheduling method includes: adding, according to correspondences between multiple tasks and M data blocks that are accessed by the multiple tasks, the multiple tasks to task queues, wherein each task of the multiple tasks is added in a task queue which is corresponding to a data block, and the data block is corresponding to the each task, wherein the M data blocks one-to-one correspond to M task queues; and using N threads to execute tasks in N task queues of the M task queues concurrently, where each of the N threads is used to execute a task in a task queue of the N task queues, different threads of the N threads execute tasks in different task queues, and $2 \leq N \leq M$.

In the task scheduling method provided in this embodiment of the present disclosure, a data block may be used as a center, each task of multiple tasks may be added to a task queue of a data block corresponding to the task, and then each thread of N threads may be used to execute a task in a task queue. In this case, even if multiple threads run concurrently, a problem does not exist that the multiple threads contend for one data block or a lock of one data block at the same time because each thread of the multiple threads is used to execute a task in task queues of different data blocks for the different data blocks.

By using this solution, when multiple threads are used to execute tasks concurrently, data contention caused by the multiple threads accessing one data block may be reduced, so as to improve task scheduling efficiency. In addition, with no need to introduce a lock mechanism in this solution, extra performance overheads caused by introducing a lock may be avoided, and difficulty in detecting and debugging a concurrent error may be reduced.

It may be figured out that a quantity of threads created in a system is limited because of restriction of system performance or system configuration. When no idle thread is used to execute a task in a task queue of a newly generated data block, the task queue of the data block needs to wait until a thread completes a task in a task queue of another data block, and then the thread is used to execute the task in the task queue corresponding to the data block. For example, when N threads are created in the system, and currently tasks in task queues of M ($2 \leq N \leq M$) data blocks need to be executed, the N threads can only execute tasks in N task queues of M task queues concurrently.

Accordingly, the method in this embodiment of the present disclosure may further include: adding at least one of the M task queues to a waiting queue group, wherein each of the at least one of the M task queues comprises at least one task, and the at least one task is not executed by a thread of the N threads, wherein the waiting queue group is used to store at least one task queue of the M task queues according to a first in first out rule. By using the solution, at least one of the M task queues may be added to the waiting queue group. In this case, any thread of the N threads may execute, after the thread is idle and according to a sequence of storing a task queue in the waiting queue group, a task in a task queue stored in the waiting queue group.

Optionally, in this embodiment of the present disclosure, the method of using the N threads to execute the tasks in the N task queues of the M task queues concurrently may specifically include: using the N threads to execute tasks in first N task queues in the waiting queue group concurrently.

The first N task queues are N task queues that are first added to the waiting queue group, and each of the N threads executes a task in a corresponding task queue of the first N task queues according to the first in first out rule.

Further, any thread in the system may be in an idle state because of completing all tasks in a task queue of a data block, or the thread may be in the idle state because of quitting executing a task in a task queue of a data block, and the thread is an idle thread. In this case, the idle thread may execute a task in a task queue that is first added to the waiting queue group after the first N task queues.

Specifically, the method in this embodiment of the present disclosure may further include: using an idle thread to execute a task in a first queue in the waiting queue group, where the first queue is a task queue that is first added to the waiting queue group after the first N task queues.

In addition, to update a task queue in the waiting queue group in real time, the method in this embodiment of the present disclosure may further include: deleting the executed first queue from the waiting queue group.

For example, in this embodiment of the present disclosure, a method in which any thread of the N threads executes a task in a task queue may include: the thread executes all tasks in the task queue one by one.

Specifically, a method in which a task scheduling apparatus uses a thread (a first thread) to execute a task in a task queue (a second queue) includes: using the first thread to read the $k^{th}$ task in the second queue, and switching to a context of the $k^{th}$ task in the second queue to start execution, where $1 \le k < K$, and K is a total quantity of tasks in the second queue; and if the first thread is used to complete the $k^{th}$ task in the second queue, making the first thread exit from the $k^{th}$ task in the second queue, using the first thread to read the $(k+1)^{th}$ task in the first queue, and switching to a context of the $(k+1)^{th}$ task in the second queue to start execution until K tasks in the second queue are completed.

It may be figured out that the foregoing thread may quit executing the $k^{th}$ task because the $k^{th}$ task in the second queue waits for a task execution result of another task queue (a third queue). In this case, the unexecuted $k^{th}$ task may be added to the third queue, and another thread (a second thread) may be used to execute the $k^{th}$ task in the third queue after the $k^{th}$ task obtains the task execution result.

Specifically, the foregoing multiple tasks include a first task belonging to the second queue, the first task waits for a task execution result of the third queue when executed by a first thread, the first thread is a thread that is in the foregoing N threads and that is used for executing a task in the second queue, the second queue is any task queue in the waiting queue group, and the third queue is a task queue that is different from the second queue in the waiting queue group.

The method in this embodiment of the present disclosure may further include: making the first thread quit executing the first task that is waiting for the task execution result, adding the quitted first task to the third queue, and using the second thread to execute the first task in the second queue after the first task obtains the task execution result.

The second thread may be a thread that is in the N threads and that completes a task in a corresponding task queue, or the second thread is a thread that is in the N threads and that is made to quit executing a task in a corresponding task queue. The foregoing first task is the $k^{th}$ task in the second queue.

By using the foregoing solution, even if a thread is made to quit executing a task because the task in a task queue being executed by the thread waits for a task execution result of another task queue, the task may be added to the another task queue. In this case, an idle thread may be used to execute the task in the task queue after the task obtains the task execution result of the another task queue.

When a thread starts to execute a task queue in the waiting queue group, it indicates that the task queue is currently not in a state of waiting for execution. To update the task queue in the waiting queue group in a timely manner so that the waiting queue group includes only a task queue in which a task not executed by a thread is located, the method in this embodiment of the present disclosure may further include: deleting, from the waiting queue group, a task queue in which a task executed by a thread of the N threads is located.

By using the foregoing solution, the task queue in which the already executed task is located is deleted from the waiting queue group in a timely manner. Therefore, the waiting queue group does not include the task queue in which the task already executed by a thread is located.

Further, in this embodiment of the present disclosure, a thread executes tasks in a task queue of a data block one by one in a specified period, that is, a thread executes, for one data block, a task corresponding to the data block in a specified period. Therefore, the thread processes same data before and after multiple times of task switching in a specified period. In this case, a problem of swap-out and swap-in of a large quantity of cache lines caused by processing different data before and after task switching in a conventional task parallel system may be avoided, so as to improve fetch efficiency and program performance.

According to a second aspect of embodiments of the present disclosure, a task scheduling apparatus is provided, including a task adding module and a task execution module.

The task adding module is configured to add, according to correspondences between multiple to-be-executed tasks and M data blocks that are to be accessed by the multiple tasks, each of the multiple tasks to a task queue of a data block corresponding to the task, where the M data blocks one-to-one correspond to M task queues.

The task execution module is configured to use N threads to execute concurrently tasks that are added by the task adding module to N task queues of the M task queues, where each of the N threads executes a task in a task queue of the N task queues, different threads of the N threads execute tasks in different task queues, and $2 \le N \le M$.

It should be noted that the task scheduling apparatus provided in this embodiment of the present disclosure includes but is not limited to the task adding module and the task execution module of the second aspect. Moreover, functions of the task adding module and the task execution module of the second aspect include but are not limited to the functions described above. The task scheduling apparatus includes modules for executing the task scheduling method of the first aspect and various optional manners of the first aspect. These modules are logical division of the task scheduling apparatus for executing the task scheduling method of the first aspect and various optional manners of the first aspect.

According to a third aspect of embodiments of the present disclosure, a task scheduling apparatus is provided. The task scheduling apparatus includes one or more processors, a memory, a bus, and a communications interface.

The memory is configured to store a computer executable instruction. The processors are connected to the memory by using the bus. When the task scheduling apparatus runs, the processors execute the computer executable instruction stored in the memory, so that the task scheduling apparatus executes the task scheduling method of the first aspect and various optional manners of the first aspect.

According to a fourth aspect of embodiments of the present disclosure, a computer readable storage medium is provided. The computer readable storage medium stores one or more program code, where the program code includes a computer executable instruction. When a processor of a task scheduling apparatus executes the computer executable instruction, the task scheduling apparatus executes the task scheduling method of the first aspect and various optional manners of the first aspect.

It should be noted that for a specific technical effect and related analysis process of the task scheduling apparatus and the task scheduling apparatus executing a program stored in the computer readable storage medium, refer to related technical effect description of the first aspect or any implementation manner of the first aspect of the embodiments of the present disclosure, and details are not repeatedly described herein.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

In the specification and accompanying drawings of the present disclosure, the terms "first", "second", and so on are intended to distinguish between different objects but do not indicate a particular order of the objects. For example, a first queue, a second queue, and the like are used to distinguish between different task queues but do not indicate a particular order of the task queues.

In the description of the present disclosure, "multiple" means two or more than two unless otherwise stated. For example, multiple processors or a multi-core processor means two or more processors.

In addition, the terms "including", "having", or any other variant thereof mentioned in descriptions of the present disclosure, are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

The following describes the technical solutions in the embodiments of the present disclosure in detail with reference to the accompanying drawings in the embodiments of the present disclosure. Apparently, the described embodiments are merely some but not all of the embodiments of the present disclosure.

The technical solutions in the embodiments of the present disclosure are applied to a scenario in which a concurrent processing capability of a multi-core processor may be used to improve processing efficiency of the multi-core processor in a process of processing "streaming application" in the media data processing field, the telecommunications data processing field, and the big data analyzing and processing field. Media data processing includes image processing, audio processing, video processing, and the like.

Figure 1:
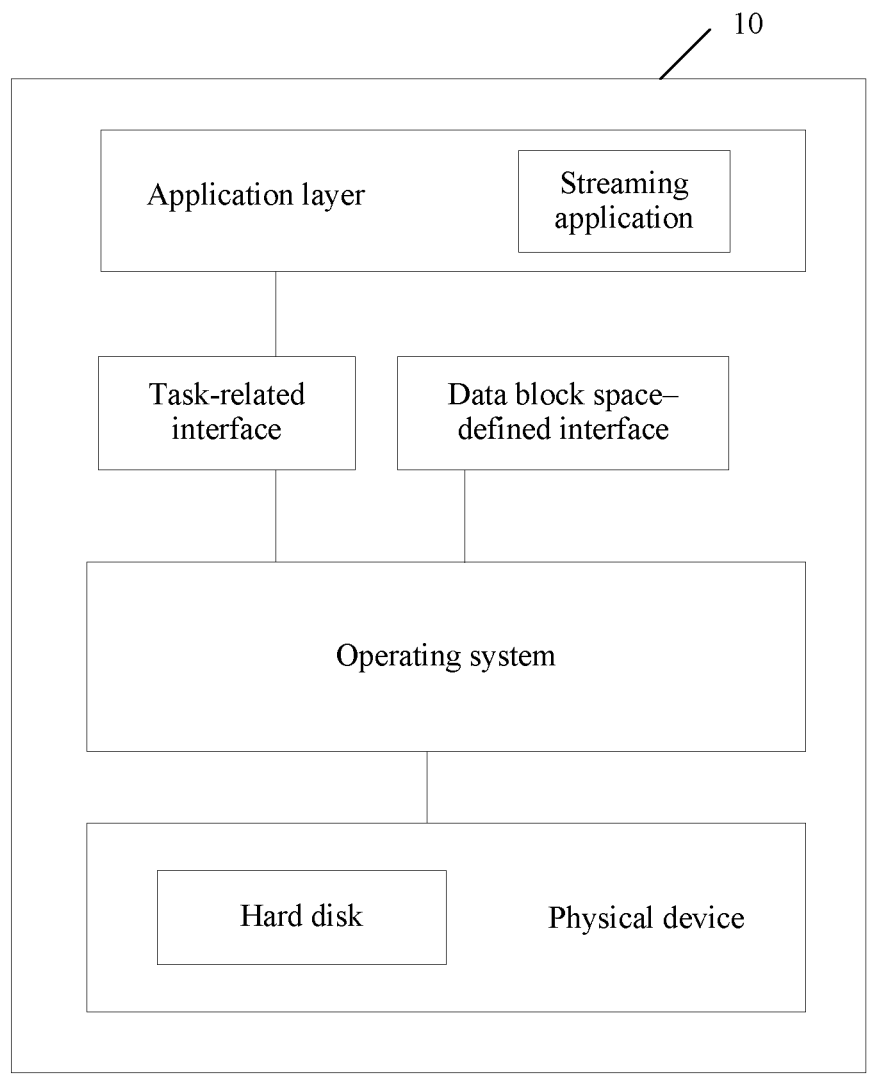
FIG. 1 is a schematic diagram of a DBOS scenario according to an embodiment of the present disclosure.

Specifically, the technical solutions may be applied to a scenario of data block oriented schedule (DBOS). As shown in FIG. 1, FIG. 1 is a schematic diagram of a DBOS scenario according to an embodiment of the present disclosure. A software and hardware framework 10 of the DBOS scenario includes a data block space-defined interface, a task-related interface, an application layer, and an operating system (OS) running in a multi-core processor.

A process of processing streaming application is used as example to describe the DBOS scenario shown in FIG. 1 in the following.

The task-related interface is configured to receive a service processing request of streaming application at the application layer for M data blocks. An operating system 12 creates, according to a processing request corresponding to each data block, at least one task for the data block, and add created tasks to a task queue of a data block specified by the task.

The data block space-defined interface is configured to receive program code that is compiled by a user to allocate memory space to the M data blocks. The operating system 12 is used to allocate the memory space to the M data blocks. The memory space is used to store a task queue of each data block of the M data blocks. The data block space-defined interface and the task-related interface may be provided by the foregoing operating system.

A multi-core processor may invoke a runtime library by using N threads configured by the operating system, use a data block as a center, and execute concurrently tasks in a task queue of N data blocks of M data blocks. N threads execute a task in a task queue of N task queues, and different threads of the N threads execute tasks in different task queues.

It may be figured out that the foregoing M data blocks may be data stored in a hard disk, or may be data stored in memory space. Certainly, the M data blocks may also be to-be-processed data that is carried in the service processing request of the streaming application. This is not limited in the embodiments of the present disclosure.

It should be noted that the embodiments of the present disclosure use the DBOS scenario shown in FIG. 1 only as an example to describe a DBOS scenario applied to the embodiments of the present disclosure. The DBOS scenario specifically applied to the embodiments of the present disclosure is not limited to the DBOS scenario shown in FIG. 1. Therefore, the DBOS scenario shown in FIG. 1 constitutes no limitation on an application scenario of the technical solutions in the embodiments of the present disclosure.

A task scheduling method provided in the embodiments of the present disclosure may be executed by a computer device in which a multi-core processor is installed (a multi-core device for short), or the task scheduling method may be executed by an apparatus that is in the multi-core device and that is configured to execute the task scheduling method, for example, a task scheduling apparatus. The task scheduling apparatus may be a central processing unit (CPU) of the multi-core device.

In the prior art, a task is used as a center, and each thread accesses a data block when executing different tasks concurrently. Therefore, a problem may exist that multiple threads contend for one data block or a lock of one data block at the same time. Comparatively, in the embodiments of the present disclosure, a data block may be used as a center, each task of multiple tasks may be added to a task queue of a data block corresponding to the task, and then each thread of N threads may be used to execute a task in a task queue. In this case, even if multiple threads run concurrently, a problem does not exist that the multiple threads contend for one data block or a lock of one data block at the same time because each thread of the multiple threads is used to execute a task in task queues of different data blocks for the different data blocks.

The multi-core device that is in the embodiments of the present disclosure and that is configured to execute the task scheduling method may be a multi-core computer device such as a personal computer (PC) and a server that may perform "streaming application" processing on an image, audio, a video, and the like.

A task scheduling method provided in the embodiments of the present disclosure is described in detail in the following with reference to accompanying drawings, by using specific embodiments and application scenarios of the embodiments, and by using an example in which the foregoing task scheduling apparatus executes the task scheduling method.

Embodiment 1

Figure 2:
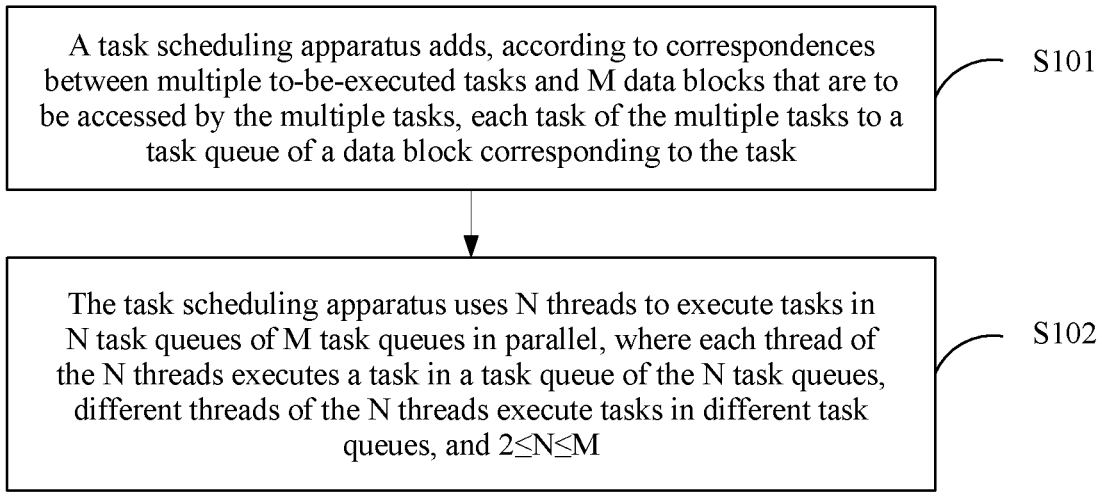
FIG. 2 is a flowchart of a task scheduling method according to an embodiment of the present disclosure.

This embodiment of the present disclosure provides a task scheduling method. As shown in FIG. 2, the task scheduling method includes the following steps.

S101. A task scheduling apparatus adds, according to correspondences between multiple to-be-executed tasks and M data blocks that are to be accessed by the multiple tasks, each of the multiple tasks to a task queue of a data block corresponding to the task.

The M data blocks one-to-one correspond to M task queues.

Figure 3:
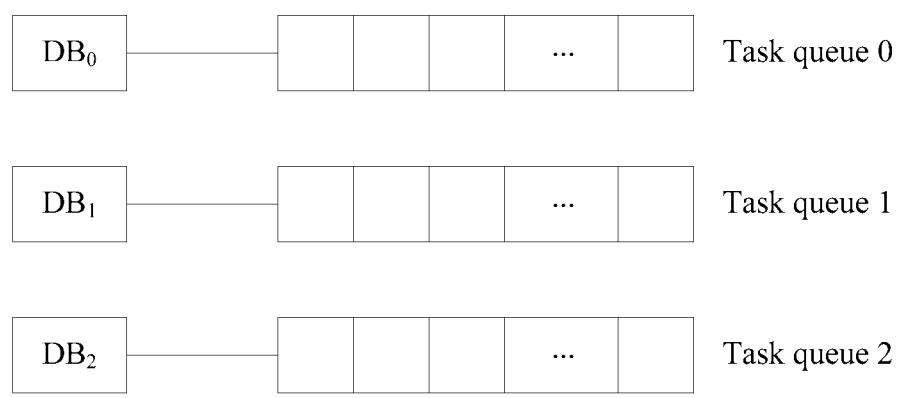
FIG. 3 is a schematic diagram of an example of a task queue of a data block according to an embodiment of the present disclosure.

For example, as shown in FIG. 3, it is assumed that there are currently three to-be-accessed data blocks ($DB_0$, $DB_1$, and $DB_2$). In the three data blocks, the $DB_0$ corresponds to a task queue 0, the $DB_1$ corresponds to a task queue 1, and the $DB_2$ corresponds to a task queue 2.

Figure 4:
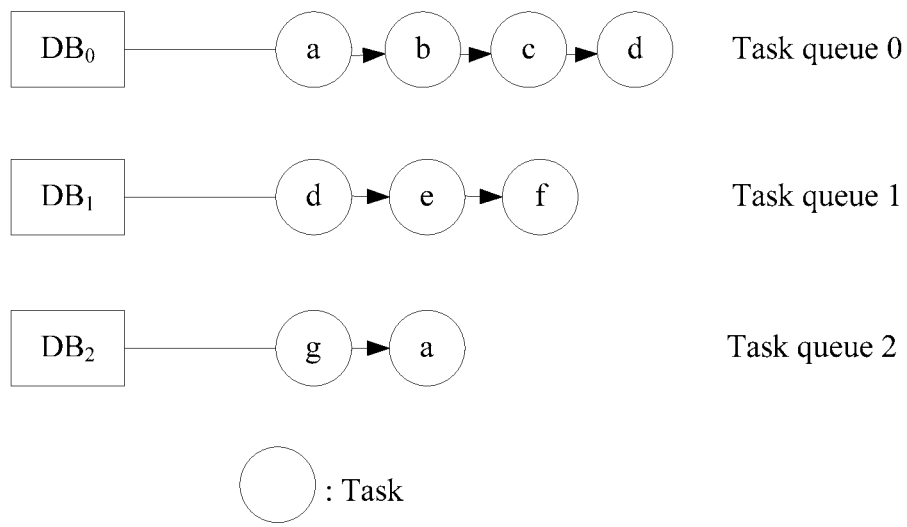
FIG. 4 is a schematic diagram of an example of another task queue of a data block according to an embodiment of the present disclosure.

It is assumed that in multiple current tasks (a task a, a task b, a task c, a task d, a task e, a task f, and a task g), the task a corresponds to the $DB_0$ and the $DB_2$, the task b corresponds to the $DB_0$, the task c corresponds to the $DB_0$, the task d corresponds to the $DB_0$ and the $DB_1$, the task e corresponds to the $DB_1$, the task f corresponds to the $DB_1$, and the task g corresponds to the $DB_2$. Therefore, as shown in FIG. 4, the task scheduling apparatus may add the task a, the task b, the task c, and the task d to a task queue (the task queue 0) of the $DB_0$, may add the task d, the task e, and the task f to a task queue (the task queue 1) of the $DB_1$, and may add the task g and the task a to a task queue (the task queue 2) of the $DB_2$.

It should be noted that the foregoing multiple to-be-executed tasks are created by the task scheduling apparatus for the foregoing M data blocks, and therefore, when the multiple tasks are created, a data block corresponding to each of the multiple tasks is specified.

The task scheduling apparatus may create respective tasks for different data blocks according to requirements. Tasks that are created by the task scheduling apparatus for all data blocks are different, and quantities of the tasks for all data blocks are also different.

It may be figured out that when creating a task for each data block, the task scheduling apparatus specifies a data block for which the task is created. Therefore, the task scheduling apparatus may add, according to a data block specified for each task when a task is created, created tasks to a task queue of a data block that is specified for the task.

As shown in FIG. 4, the task scheduling apparatus creates four tasks for the $DB_0$, including the task a, the task b, the task c, and the task d; the task scheduling apparatus creates three tasks for the $DB_1$, including the task d, the task e, and the task f; and the task scheduling apparatus creates two tasks for the $DB_2$, including the task g and the task a.

It should be noted that for a method in which the task scheduling apparatus creates a task for a data block, refer to a related method for creating a task for a data block in the prior art, and details are not repeatedly described in this embodiment of the present disclosure.

S102. The task scheduling apparatus uses N threads to execute tasks in N task queues of M task queues concurrently, where each of the N threads executes a task in a task queue of the N task queues, different threads of the N threads execute tasks in different task queues, and $2 \leq N \leq M$.

The task scheduling apparatus may use the N threads as N scheduler threads to schedule N task queues concurrently, and use each of the N threads to execute a task in a task queue of N task queues.

In this embodiment of the present disclosure, a method in which any thread of the N threads executes a task in a task queue may be that the thread executes all tasks in the task queue one by one.

Figure 5:
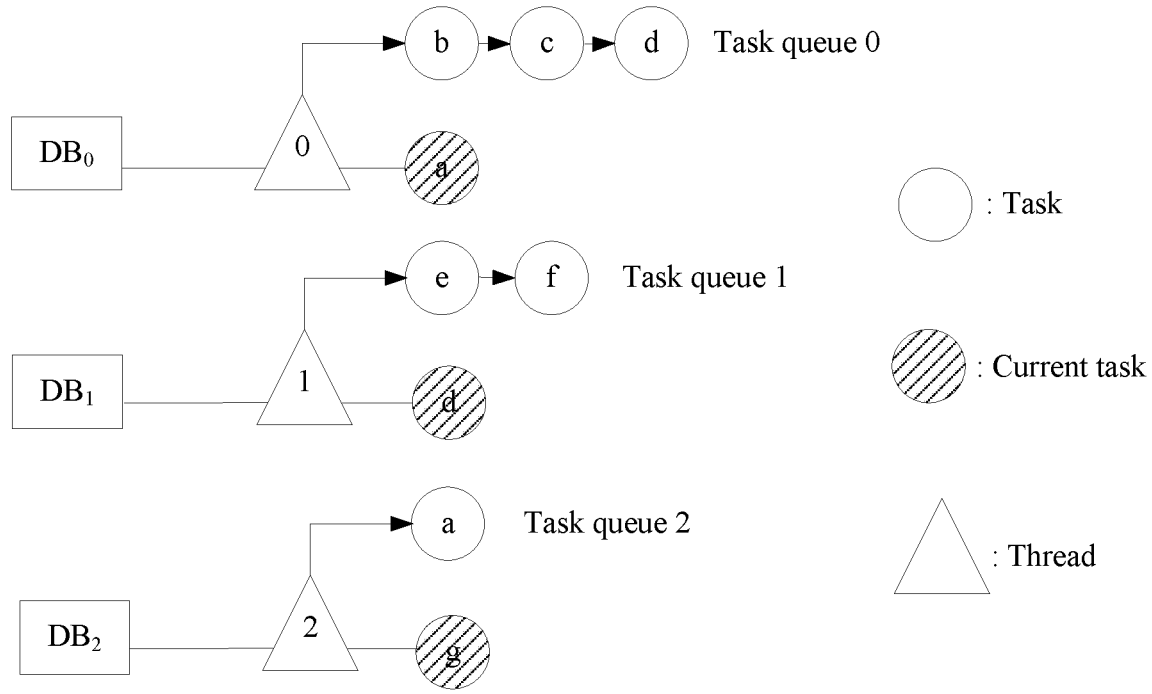
FIG. 5 is a schematic diagram of an example of a task queue of a thread scheduling data block according to an embodiment of the present disclosure.

For example, as shown in FIG. 5, the task scheduling apparatus may use $Thread_0$, $Thread_1$, and $Thread_2$ to execute tasks in the task queue 0, the task queue 1, and the task queue 2 concurrently. Specifically, the task scheduling apparatus may use the $Thread_0$ to execute the task a, the task b, the task c, and the task d in the task queue 0, use the $Thread_1$ to execute the task d, the task e, and the task f in the task queue 1, and use the $Thread_2$ to execute the task g and the task a in the task queue 2 at the same time.

In an example shown in FIG. 5 in which the $Thread_0$, the $Thread_1$, and the $Thread_2$ are used to execute the tasks in the task queue 0, the task queue 1, and the task queue 2 concurrently, the task a, the task b, the task c, and the task d need to be executed for the $DB_0$, the task d, the task e, and the task f need to be executed for the $DB_1$, and the task g and the task a need to be executed for the $DB_2$ in a process in which the $Thread_0$, the $Thread_1$, and the $Thread_2$ are used to execute the tasks in the task queue 0, the task queue 1, and the task queue 2 concurrently. However, for each data block, only one thread is used to execute a task in a task queue of the data block. For example, the $Thread_0$ is used to execute the task a, the task b, the task c, and the task d for the $DB_0$, the $Thread_1$ is used to execute the task d, the task e, and the task f for the $DB_1$, and the $Thread_2$ is used to execute the task g and the task a for the $DB_2$. Therefore, a problem does not exist that multiple threads contend for one data block or a lock of one data block at the same time.

It may be figured out that the N threads in this embodiment of the present disclosure may be created by the task scheduling apparatus according to system configuration. In a multi-core processor system, to ensure full use of system hardware resources, threads whose quantity is the same as a quantity of cores of a current processor (or a quantity of hardware threads) may be usually created. That is, N may be a quantity of cores of a processor in the task scheduling apparatus. A thread in this embodiment of the present disclosure is an operating system thread (OS Thread).

For example, if the processor in the task scheduling apparatus has three cores, the task scheduling apparatus may create three threads, including $Thread_0$, $Thread_1$, and $Thread_2$. That is, one thread runs in one core of the processor.

In the task scheduling method provided in this embodiment of the present disclosure, a data block may be used as a center, each task of multiple tasks may be added to a task queue of a data block corresponding to the task, and then each thread of N threads may be used to execute a task in a task queue. In this case, even if multiple threads run concurrently, a problem does not exist that the multiple threads contend for one data block or a lock of one data block at the same time because each thread of the multiple threads is used to execute a task in task queues of different data blocks for the different data blocks.

That is, by using this solution, when multiple threads are used to execute tasks concurrently, data contention caused by the multiple threads accessing one data block may be reduced, so as to improve task scheduling efficiency. In addition, with no need to introduce a lock mechanism in this solution, extra performance overheads caused by introducing a lock may be avoided, and difficulty in detecting and debugging a concurrent error may be reduced.

In addition, in this embodiment of the present disclosure, a thread executes tasks in a task queue of a data block one by one in a specified period, that is, a thread executes, for one data block, a task corresponding to the data block in a specified period. Therefore, the thread processes same data before and after multiple times of task switching in a specified period. In this case, a problem of swap-out and swap-in of a large quantity of cache lines caused by processing different data before and after task switching in a conventional task parallel system may be avoided, so as to improve fetch efficiency and program performance.

Further, a quantity of threads created in a system is limited because of restriction of system performance or system configuration, but a quantity of data blocks is generally free from the restriction of the system performance or the system configuration. Therefore, when the quantity of the data blocks is greater than the quantity of the threads, a task queue of a part of data blocks needs to wait until an idle thread exists in N threads, and the idle thread is used to execute a task in the task queue of the part of data blocks.

For example, when N threads are created in the system, and currently tasks in task queues of M (2≤N≤M) data blocks need to be executed, the N threads can only execute tasks in N task queues of M task queues concurrently. Remaining M-N task queues need to wait until an idle thread exists in the N threads, and then the idle thread is used to execute a task in the M-N task queues.

Figure 6:
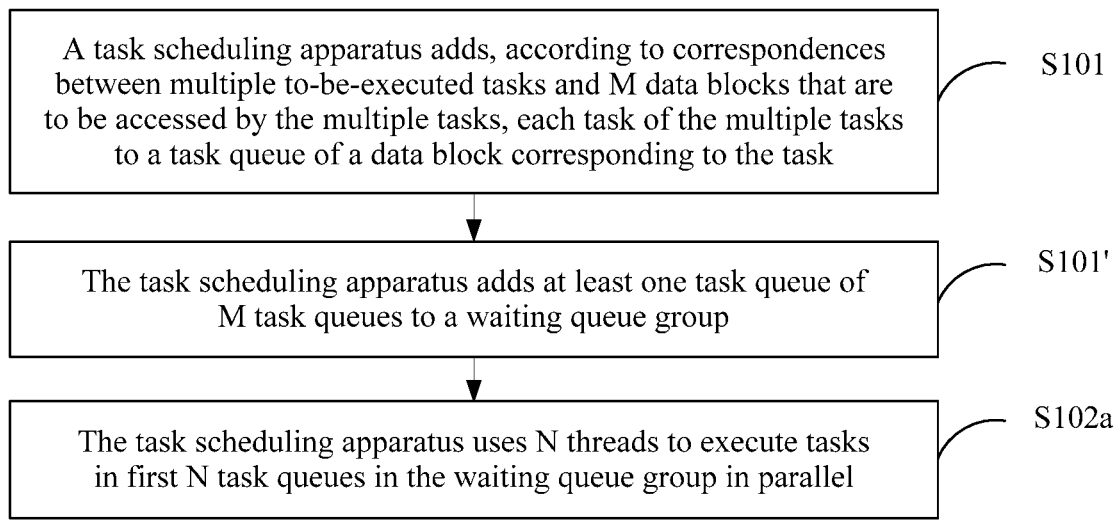
FIG. 6 is a flowchart of another task scheduling method according to an embodiment of the present disclosure.

Based on this, as shown in FIG. 6, the method in this embodiment of the present disclosure may further include S101':

S101'. The task scheduling apparatus adds at least one of M task queues to a waiting queue group.

Each of the at least one task queue includes at least one task, and the at least one task is not executed by a thread of the N threads. The waiting queue group is used to store a task queue of the M task queues according to a first in first out rule.

Figure 7:
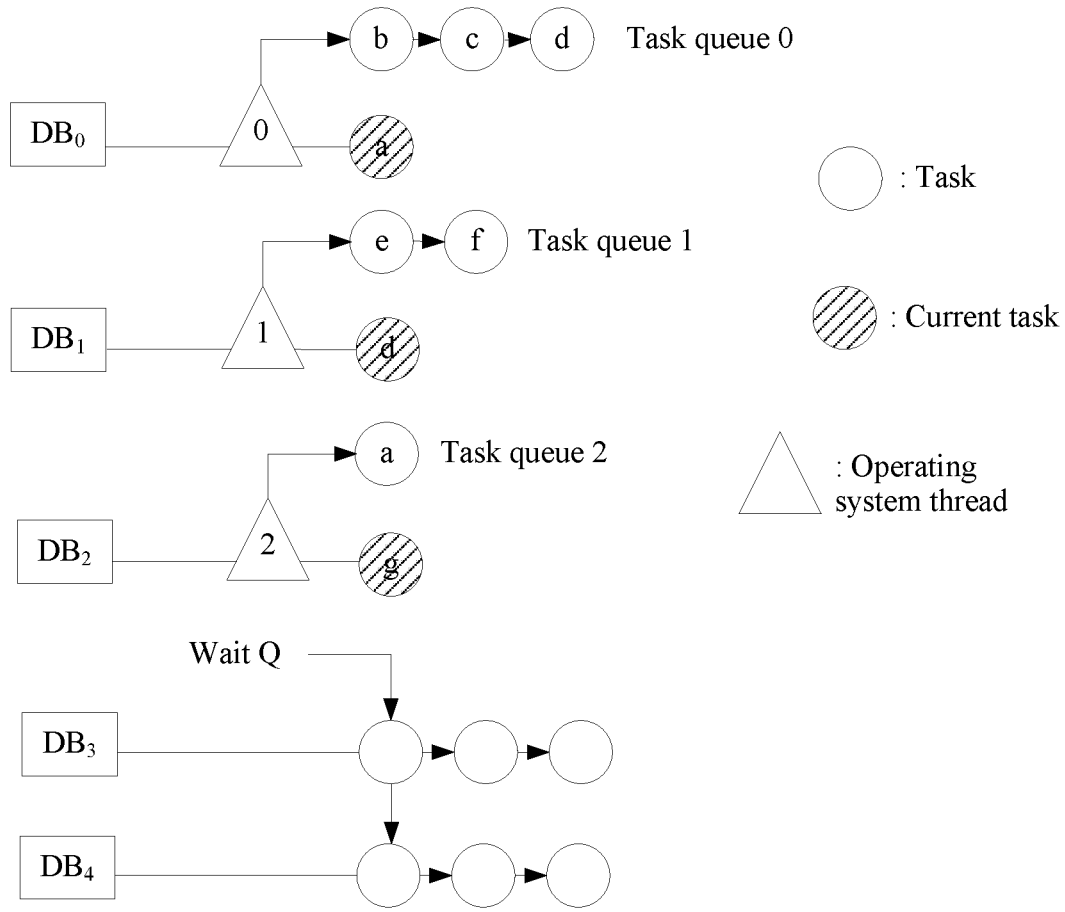
FIG. 7 is a schematic diagram of an example of another task queue of a thread scheduling data block according to an embodiment of the present disclosure.

For example, when a quantity of the threads created in the system is limited, and no idle thread is used to execute a task queue of a newly generated data block, the task scheduling apparatus may add the task queue of the generated data block to the waiting queue group. As shown in FIG. 7, the task scheduling apparatus may add, to the waiting queue (Wait Queue, Wait Q) group, a task queue (a task queue 3) of a data block $DB_3$ and a task queue (a task queue 4) of a data block $DB_4$.

The WQ group stores, according to the first in first out rule, a task queue to which a task is already added but whose task is not executed. In FIG. 7, the task queue of the $DB_3$ is added to the WQ group before the task queue of the $DB_4$. Therefore, when any thread of the N threads is an idle thread, the task scheduling apparatus may first use the idle thread to schedule the task queue of the $DB_3$ to execute a task in the task queue of the $DB_3$.

It may be understood that after at least one of the M task queues is added to the waiting queue group, the any thread of the N threads may be used to execute, after the thread is idle and according to a sequence of storing a task queue in the waiting queue group, a task in a task queue stored in the waiting queue group.

Optionally, as shown in FIG. 6, S102 in FIG. 2 may be replaced by S102a:

S102a. The task scheduling apparatus uses the N threads to execute tasks in first N task queues in the waiting queue group concurrently.

The first N task queues are N task queues that are first added to the waiting queue group, and each of the N threads executes a task in a corresponding task queue of the first N task queues according to the first in first out rule.

Figure 8:
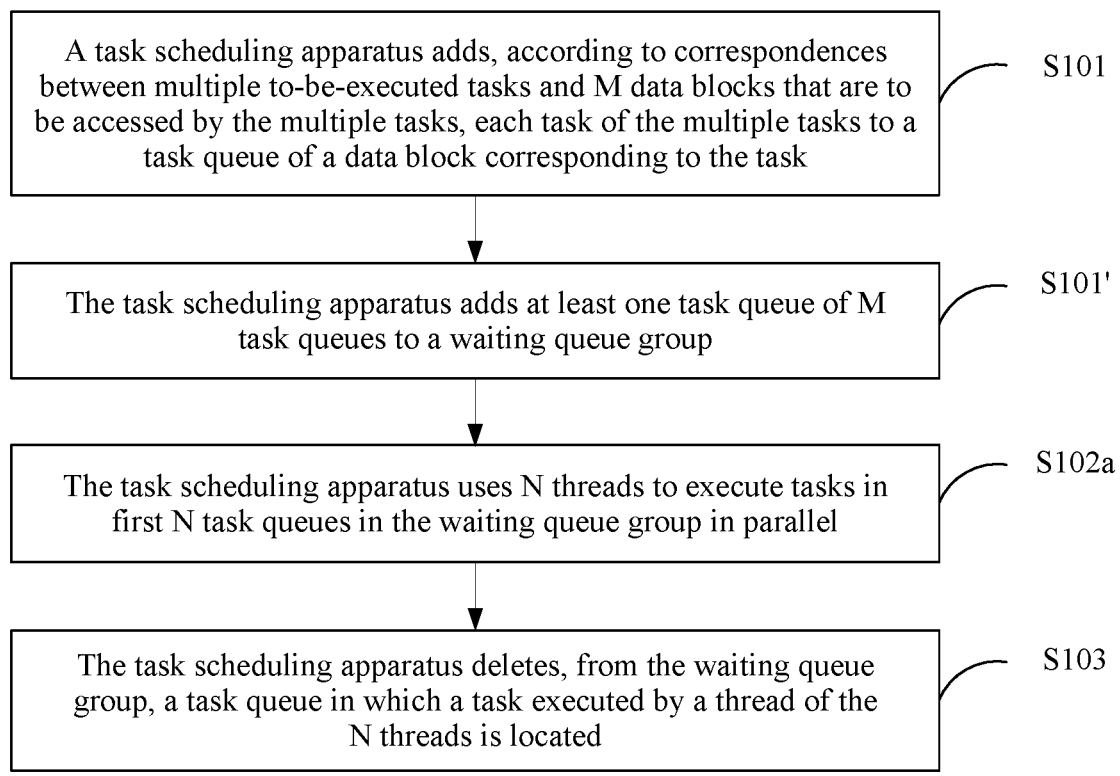
FIG. 8 is a flowchart of another task scheduling method according to an embodiment of the present disclosure.

Further, when a thread starts to execute a task queue in the waiting queue group, it indicates that the task queue is currently not in a state of waiting for execution. To update a task queue in the waiting queue group in a timely manner so that the waiting queue group includes only a task queue in which a task not executed by a thread is located, as shown in FIG. 8, the method in this embodiment of the present disclosure may further include S103:

S103. The task scheduling apparatus deletes, from the waiting queue group, a task queue in which a task executed by a thread of the N threads is located.

The task queue in which the task already executed by the thread of the N threads is located is deleted from the waiting queue group in a timely manner. Therefore, the waiting queue group does not include the task queue in which the task already executed by the thread is located.

It may be figured out that any thread in the system may be in an idle state because of completing all tasks in a task queue of a data block, or the thread may be in the idle state because of quitting executing a task in a task queue of a data block, and the thread is an idle thread. In this case, the idle thread may execute a task in a task queue that is first added to the waiting queue group after the first N task queues.

Figure 9:
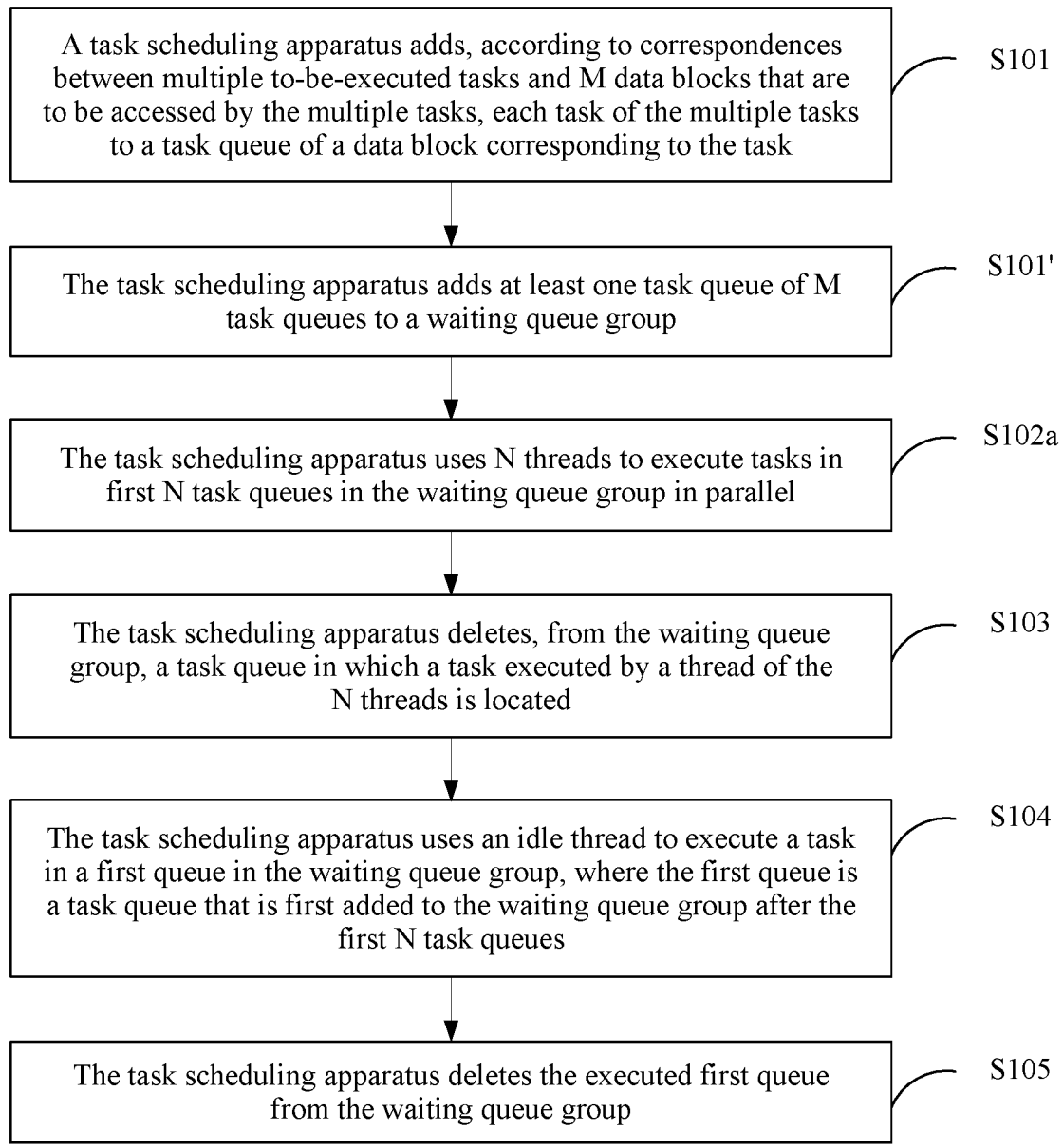
FIG. 9 is a flowchart of another task scheduling method according to an embodiment of the present disclosure.

Specifically, as shown in FIG. 9, the method in this embodiment of the present disclosure may further include S104:

S104. The task scheduling apparatus uses an idle thread to execute a task in a first queue in the waiting queue group, where the first queue is a task queue that is first added to the waiting queue group after the first N task queues.

The idle thread may be a thread that is in the N threads and that completes a task in a corresponding task queue.

In addition, to update the task queue in the waiting queue group in real time, as shown in FIG. 9, the method in this embodiment of the present disclosure may further include S105:

S105. The task scheduling apparatus deletes the executed first queue from the waiting queue group.

By using the foregoing solution, the task queue in which the already executed task is located is deleted from the waiting queue group in a timely manner. This may ensure that the waiting queue group includes only a task queue in which a task not executed by a thread is located.

Further, before S101, the method in this embodiment of the present disclosure further includes the following step: the task scheduling apparatus creates a task queue for each data block of the M data blocks.

The task queue created by the task scheduling apparatus for the data block is used to store a task corresponding to the data block. In this embodiment of the present disclosure, a task queue initially created by the task scheduling apparatus for each data block is emptied.

For example, as shown in FIG. 3, the task scheduling apparatus with a data block as a center may create the task queue 0 for adding a task corresponding to the $DB_0$ for $DB_0$, create the task queue 1 for adding a task corresponding to the $DB_1$ for $DB_1$, and create the task queue 2 for adding a task corresponding to the $DB_2$ for $DB_2$.

Further, before the task scheduling apparatus creates a task queue for each data block of the M data blocks, the task scheduling apparatus may allocate, to the M data blocks, memory space for storing task queues of the M data blocks. Specifically, the method in this embodiment of the present disclosure may further include the following step: the task scheduling apparatus allocates the memory space to the M data blocks, where the memory space is used to store a task queue of each data block of the M data blocks.

For example, the task scheduling apparatus may allocate the memory space to the M data blocks according to a data block type, a data block size, and a data block quantity of a data block of the M data blocks.

It should be noted that for another method in which the task scheduling apparatus allocates the memory space to the M data blocks, refer to a related method for allocating memory space to a data block in a data processing process in the prior art, and details are not repeatedly described herein.

Further, in the foregoing embodiment, in S102, S102*a*, or S104, a method in which the task scheduling apparatus uses a thread (such as a first thread) to execute a task in a task queue (such as a second queue) may specifically include Sa and Sb:

Sa. The task scheduling apparatus uses the first thread to read the $k^{th}$ task in the second queue, and switches to a context of the $k^{th}$ task in the second queue to start execution, where $1 \leq k < K$, and K is a total quantity of tasks in the second queue.

Sb. If using the first thread to complete the $k^{th}$ task in the second queue, the task scheduling apparatus makes the first thread exit from the $k^{th}$ task in the second queue, uses the first thread to read the $(k+1)^{th}$ task in the second queue, and switches to a context of the $(k+1)^{th}$ task in the second queue to start execution until K tasks in the second queue are completed.

Further, the first thread may quit executing the $k^{th}$ task because the $k^{th}$ task (that is, a first task) in the second queue waits for a task execution result of a third queue. For this case, the method in which the task scheduling apparatus uses the first thread to execute the task in the second queue may further include Sc:

Sc. The task scheduling apparatus makes the first thread quit executing the first task (the $k^{th}$ task in the second queue) that is waiting for the task execution result of the third queue, adds the quitted first task to the third queue, and uses a second thread to execute the first task in the second queue after the first task obtains the task execution result.

The second queue is any task queue in the foregoing waiting queue group, and the third queue is a task queue that is different from the second queue in the waiting queue group.

It may be understood that after the first thread is made to quit executing the first task that is waiting for the task execution result, the first thread cannot be used to execute another task in a task queue (the second queue) in which the first task is located. In this case, the first thread becomes an idle thread, and may be used to execute a task in another task queue in the waiting queue group.

Therefore, the idle thread in the foregoing embodiments (such as the idle thread in S104) may be a thread that is in the N threads and that completes a task in a corresponding task queue, or the idle thread may also be a thread that is in the N threads and that is made to quit executing a task in a corresponding task queue.

In addition, after the first task obtains the task execution result, an idle thread may be used to execute the first task in the second queue. That is, the foregoing second thread becomes an idle thread when the first task obtains the task execution result.

Likewise, the second thread is a thread that is in the N threads and that completes a task in a corresponding task queue, or the second thread is a thread that is in the N threads and that is made to quit executing a task in a corresponding task queue.

For example, the task scheduling apparatus may implement that "the task scheduling apparatus uses a thread a to execute a task in a task queue" by using the following algorithm program. The specific algorithm program is as follows:

---

Algorithm DBOS Schedule

1: function Schedule( )
2:     while true do
3:         while Wait Q not empty do
4:             Lock(Wait Q)

-continued

| | Algorithm DBOS Schedule |
|---|---|
| 5: | current Task ⟵ Wait Q.dequeue( ) |
| 6: | unlock(Wait Q) |
| 7: | while current Task not null do |
| 8: | swap Context (current Task) |
| 9: | if current Task done then |
| 10: | current Task ⟵ current Task.next |
| 11: | continue |
| 12: | end if |
| 13: | if current Task blocked by another task t then |
| 14: | add To Waiting List (current Task , t) |
| 15: | break |
| 16: | end if |
| 17: | end while |
| 18: | end while |
| 19: | suspend until Wait Q is empty |
| 20: | end while |
| 21: | end function |

The algorithm program is described in detail as follows:

The third to the eighteenth lines in the algorithm program are used to cyclically determine whether Wait Q (that is, the waiting queue group in this embodiment of the present disclosure) is empty.

If Wait Q is empty, it indicates that no task queue is to be processed in the system currently, and in this case, a thread (that is, a scheduler thread) is suspended (for details, refer to the nineteenth line in the algorithm program); or if Wait Q is not empty, the thread a is used to read a first task in a task queue 1 in Wait Q (for details, refer to the fourth to the sixth lines in the algorithm program), and is switched to a context of the first task in the task queue 1 to start execution (for details, refer to the eighth line in the algorithm program). The task queue 1 is a task queue that is first added to Wait Q in task queues currently included in Wait Q.

After the thread a is made to quit executing the first task in the task queue 1, determine a reason that makes the thread a quit executing the first task in the task queue 1 (for details, refer to the ninth to the sixteenth lines in the algorithm program).

If the thread a is made to quit executing the first task in the task queue 1 because the thread a completes the first task in the task queue 1 (for details, refer to the ninth line in the algorithm program), the thread a is used to read the second task in the task queue 1, and is switched to a context of the second task in the task queue 1 to start execution (for details, refer to the tenth and the eleventh lines in the algorithm program); or if the thread a is made to quit executing the first task in the task queue 1 because the first task in the task queue 1 waits for a task execution result of a task queue t (for details, refer to the thirteenth line in the algorithm program), the first task in the task queue 1 is added to the task queue t; and after the first task in a task queue 1 obtains the task execution result of the task queue t, an idle thread is used to execute the first task in the task queue 1 (for details, refer to the fourteenth line in the algorithm program). The task queue t is a task queue that is different from the task queue 1 in Wait Q.

After the thread a is made to quit executing the first task in the task queue 1 because the first task in the task queue 1 waits for the task execution result of the task queue t, the thread a becomes an idle thread, and the thread a may be used to execute a task in a next task queue in Wait Q (for details, refer to the fifteenth line in the algorithm program).

In the task scheduling method provided in this embodiment of the present disclosure, a data block may be used as a center, each task of multiple tasks may be added to a task queue of a data block corresponding to the task, and then each thread of N threads may be used to execute a task in a task queue. In this case, even if multiple threads run concurrently, a problem does not exist that the multiple threads contend for one data block or a lock of one data block at the same time because each thread of the multiple threads is used to execute a task in task queues of different data blocks for the different data blocks.

That is, by using this solution, when multiple threads are used to execute tasks concurrently, data contention caused by the multiple threads accessing one data block may be reduced, so as to improve task scheduling efficiency. In addition, with no need to introduce a lock mechanism in this solution, extra performance overheads caused by introducing a lock may be avoided, and difficulty in detecting and debugging a concurrent error may be reduced.

In addition, when no idle thread can be used to execute a task in a task queue, the task queue may be added to a waiting queue group. Moreover, a task queue in which an already executed task is located may be deleted from the waiting queue group in a timely manner, so that the waiting queue group does not include a task queue in which a task already executed by a thread is located.

Embodiment 2

Figure 10:
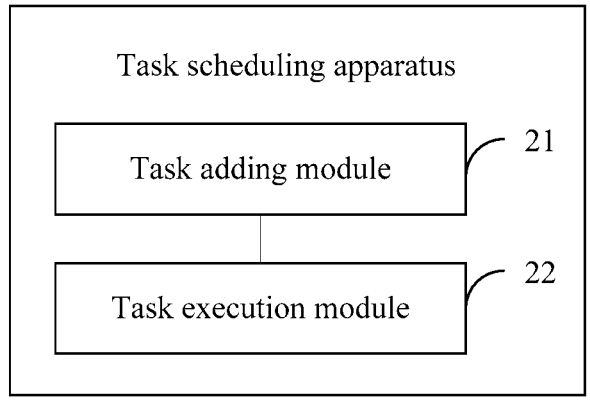
FIG. 10 is a schematic diagram of structural composition of a task scheduling apparatus according to an embodiment of the present disclosure.

This embodiment of the present disclosure provides a task scheduling apparatus. As shown in FIG. 10, the task scheduling apparatus includes a task adding module 21 and a task execution module 22.

The task adding module 21 is configured to add, according to correspondences between multiple to-be-executed tasks and M data blocks that are to be accessed by the multiple tasks, each of the multiple tasks to a task queue of a data block corresponding to the task, where the M data blocks one-to-one correspond to M task queues.

The task execution module 22 is configured to use N threads to execute concurrently tasks that are added by the task adding module 21 to N task queues of the M task queues, where each of the N threads executes a task in a task queue of the N task queues, different threads of the N threads execute tasks in different task queues, and 2≤N≤M.

Figure 11:
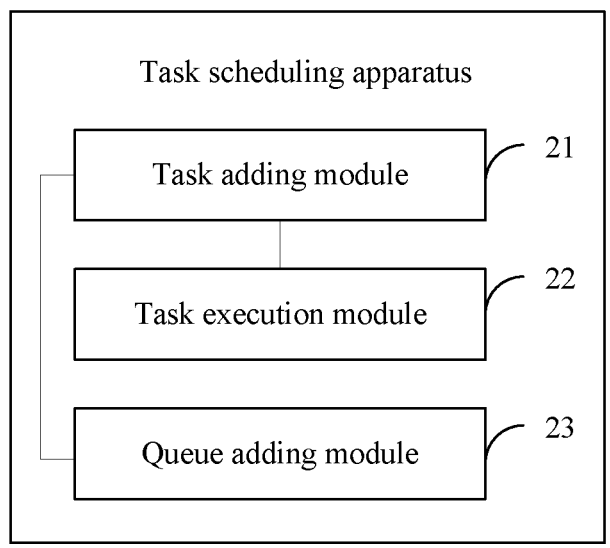
FIG. 11 is a schematic diagram of structural composition of another task scheduling apparatus according to an embodiment of the present disclosure.

Further, as shown in FIG. 11, the task scheduling apparatus may further include a queue adding module 23.

The queue adding module 23 is configured to add at least one of the M task queues to a waiting queue group, where each of the at least one task queue includes at least one task, and the at least one task is not executed by a thread of the N threads.

The waiting queue group is used to store a task queue of the M task queues according to a first in first out rule.

It may be figured out that the task adding module 21 adds a task in each of the at least one task queue to a corresponding task queue.

Further, the task execution module 22 is specifically configured to:

use the N threads to execute tasks in first N task queues in the waiting queue group concurrently.

The first N task queues are N task queues that are first added to the waiting queue group, and each of the N threads executes a task in a corresponding task queue of the first N task queues according to the first in first out rule.

Further, the task execution module 22 is further configured to use an idle thread to execute a task in a first queue in the waiting queue group, where the first queue is a task queue that is first added to the waiting queue group after the first N task queues.

Figure 12:
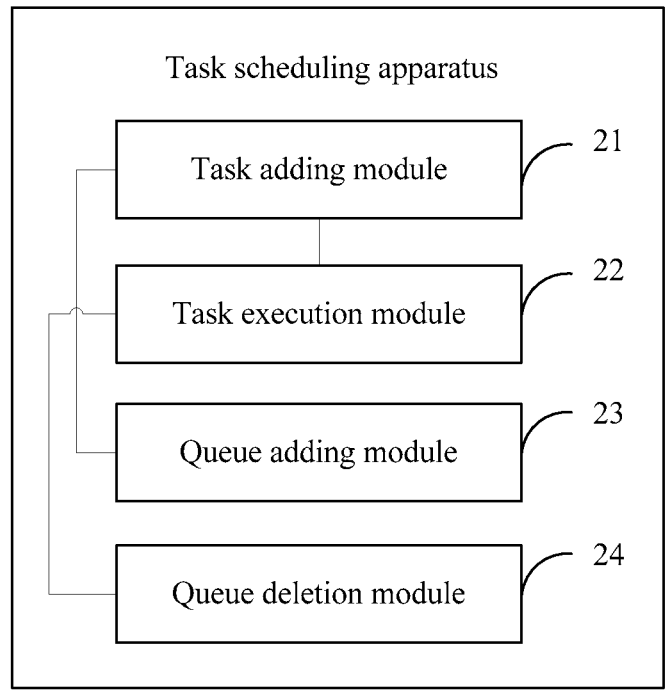
FIG. 12 is a schematic diagram of structural composition of another task scheduling apparatus according to an embodiment of the present disclosure.

As shown in FIG. 12, the task scheduling apparatus may further include a queue deletion module 24.

The queue deletion module 24 is configured to delete the first queue executed by the task execution module 22 from the waiting queue group.

The foregoing idle thread is a thread that is in the N threads and that completes a task in a corresponding task queue, or the idle thread is a thread that is in the N threads and that is made to quit executing a task in a corresponding task queue.

Further, the foregoing multiple tasks include a first task belonging to a second queue, the first task waits for a task execution result of a third queue when executed by a first thread, the first thread is a thread that is in the N threads and that is used for executing a task in the second queue, the second queue is any task queue in the waiting queue group, and the third queue is a task queue that is different from the second queue in the waiting queue group.

The task scheduling apparatus may further include a task control module.

The task control module is configured to make the first thread quit executing the first task that is waiting for the task execution result.

Correspondingly, the task adding module 21 is further configured to add the quitted first task to the third queue.

The task execution module 22 is further configured to use a second thread to execute the first task in the second queue after the first task obtains the task execution result.

The second thread is a thread that is in the N threads and that completes a task in a corresponding task queue, or the second thread is a thread that is in the N threads and that is made to quit executing a task in a corresponding task queue.

Further, the queue deletion module 24 is further configured to delete, from the waiting queue group, a task queue in which a task executed by a thread of the N threads is located.

It should be noted that for specific description of various function modules in the task scheduling apparatus provided in this embodiment of the present disclosure, refer to corresponding content in the method embodiments of the present disclosure, and details are not repeatedly described in this embodiment.

The task scheduling apparatus provided in this embodiment of the present disclosure with a data block as a center may add each task of multiple tasks to a task queue of a data block corresponding to the task, and then use each thread of N threads to execute a task in a task queue. In this case, even if multiple threads run concurrently, a problem does not exist that the multiple threads contend for one data block or a lock of one data block at the same time because each thread of the multiple threads is used to execute a task in task queues of different data blocks for the different data blocks.

That is, by using this solution, when multiple threads are used to execute tasks concurrently, data contention caused by the multiple threads accessing one data block may be reduced, so as to improve task scheduling efficiency. In addition, with no need to introduce a lock mechanism in this solution, extra performance overheads caused by introducing a lock may be avoided, and difficulty in detecting and debugging a concurrent error may be reduced.

In addition, in this embodiment of the present disclosure, a thread executes tasks in a task queue of a data block one by one in a specified period, that is, a thread executes, for one data block, a task corresponding to the data block in a specified period. Therefore, the thread processes same data before and after multiple times of task switching in a specified period. In this case, a problem of swap-out and swap-in of a large quantity of cache lines caused by processing different data before and after task switching in a conventional task parallel system may be avoided, so as to improve fetch efficiency and program performance.

Embodiment 3

Figure 13:
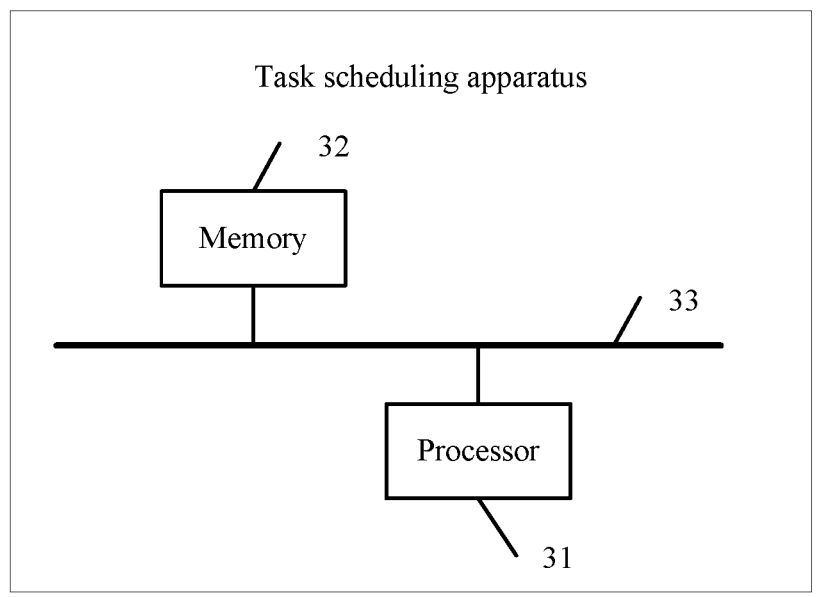
FIG. 13 is a schematic diagram of structural composition of another task scheduling apparatus according to an embodiment of the present disclosure.

This embodiment of the present disclosure provides a task scheduling apparatus. As shown in FIG. 13, the task scheduling apparatus includes:

one or more processors 31, a memory 32, a bus system 33, and one or more application programs, where the one or more processors 31 are connected to the memory 32 by using the bus system 33, the one or more application programs are stored in the memory 32, and the one or more application programs include an instruction.

The processors 31 are configured to execute the instruction, and are specifically configured to replace the task adding module 21, the task execution module 22, the queue adding module 23, the queue deletion module 24, and the like to execute the task scheduling method shown in any accompanying drawing of FIG. 2, FIG. 6, FIG. 8, and FIG. 9. That is, the processors 31 may be integration of function units or function modules of the task adding module 21, the task execution module 22, the queue adding module 23, the queue deletion module 24, and the like, that is, the various function modules may be integrated into one of the processors 31 for implementation.

The processors 31 may be a central processing unit (CPU) or an application-specific integrated circuit (ASIC), or may be configured as one or more integrated circuits that implement the embodiments of the present disclosure.

A bus may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus, and the like. For ease of indication, the bus is represented by using only one thick line in FIG. 13; however, it does not indicate that there is only one bus or only one type of buses.

An embodiment of the present disclosure further provides a computer readable storage medium. The computer readable storage medium stores one or more program code, and the one or more program code includes an instruction. When the processors 31 in the task scheduling apparatus execute the instruction, the task scheduling apparatus executes the task scheduling method shown in any accompanying drawing of FIG. 2, FIG. 6, FIG. 8, and FIG. 9.

The computer readable storage medium may include a high-speed RAM memory, or may include a non-volatile memory, for example, at least one disk memory.

It should be noted that the foregoing program code may be used as a component of an embedded operating system running in the task scheduling apparatus, or may be used as a component of various application programs running in the task scheduling apparatus. Comparatively, when the task scheduling method provided in the foregoing embodiments is used as a component of the embedded operating system, there may be no need to modify an application program, and implementation difficulty and modification workload are relatively low.

In a specific implementation process, various steps in a method procedure shown in any accompanying drawing of FIG. 2, FIG. 6, FIG. 8, and FIG. 9 may be implemented by using the task scheduling apparatus of a hardware form to execute program code of a software form stored in anon-volatile storage medium.

It should be noted that for specific description of function modules in the task scheduling apparatus provided in this embodiment of the present disclosure, refer to related description of corresponding parts in the method embodiments of the present disclosure, and details are not repeatedly described in this embodiment.

The task scheduling apparatus provided in this embodiment of the present disclosure with a data block as a center may add each task of multiple tasks to a task queue of a data block corresponding to the task, and then use each thread of N threads to execute a task in a task queue. In this case, even if multiple threads run concurrently, a problem does not exist that the multiple threads contend for one data block or a lock of one data block at the same time because each thread of the multiple threads is used to execute a task in task queues of different data blocks for the different data blocks.

That is, by using this solution, when multiple threads are used to execute tasks concurrently, data contention caused by the multiple threads accessing one data block may be reduced, so as to improve task scheduling efficiency. In addition, with no need to introduce a lock mechanism in this solution, extra performance overheads caused by introducing a lock may be avoided, and difficulty in detecting and debugging a concurrent error may be reduced.

In addition, in this embodiment of the present disclosure, a thread executes tasks in a task queue of a data block one by one in a specified period, that is, a thread executes, for one data block, a task corresponding to the data block in a specified period. Therefore, the thread processes same data before and after multiple times of task switching in a specified period. In this case, a problem of swap-out and swap-in of a large quantity of cache lines caused by processing different data before and after task switching in a conventional task parallel system may be avoided, so as to improve fetch efficiency and program performance.

The foregoing descriptions of implementation manners allow a person skilled in the art to understand that, for the purpose of convenient and brief description, division of the foregoing function modules is used as an example for illustration. In actual application, the foregoing functions can be allocated to different modules and implemented according to a requirement, that is, an internal structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A task scheduling method, comprising:
adding, by one or more processors, according to a correspondence between a plurality of tasks and M data blocks accessed by the plurality of tasks, each task of the plurality of tasks to one of M task queues associated with a data block that corresponds to the task being added, wherein the M data blocks correspond one-to-one to the M task queues; and
executing, by the one or more processors, N threads to concurrently perform tasks in N task queues of the M task queues, wherein each of the N threads executes a task in one task queue of the N task queues, different threads of the N threads execute tasks in different task queues, and 2≤N≤M.

2. The method according to claim 1, further comprising:
adding at least one of the M task queues to a waiting queue group, wherein each of the at least one of the M task queues comprises at least one task that has not been executed by a thread of the N threads,
wherein the waiting queue group stores at least one task queue of the M task queues according to a first-in-first-out (FIFO) rule.

3. The method according to claim 2, wherein the executing the N threads to concurrently perform the tasks in the N task queues of the M task queues comprises:

executing the N threads to concurrently perform tasks in a first set of task queues in the waiting queue group,
wherein the first set of task queues includes N task queues that are first added to the waiting queue group, and each of the N threads performs a task in a corresponding task queue of the first set of task queues according to the FIFO rule.

4. The method according to claim 3, further comprising:
using an idle thread to perform a task in a first queue in the waiting queue group, wherein the first queue is a task queue that is added to the waiting queue group after the first set of task queues; and
deleting the first queue from the waiting queue group,
wherein the idle thread is a thread that is in the N threads and that has completed a task in a corresponding task queue.

5. The method according to claim 3, further comprising:
using an idle thread to perform a task in a first queue in the waiting queue group, wherein the first queue is a task queue that is added to the waiting queue group after the first set of task queues; and
deleting the first queue from the waiting queue group,
wherein the idle thread is a thread that is in the N threads and that is made to quit executing a task in a corresponding task queue.

6. The method according to claim 2, wherein:
the plurality of tasks comprises a first task belonging to a second queue,
the first task, when executed by a first thread, waits for a task execution result of a third queue,
the first thread is in the N threads and is configured to execute tasks in the second queue,
the second queue is in the waiting queue group,
the third queue is in the waiting queue group and different from the second queue, and
the method further comprises:
making the first thread quit executing the first task that is waiting for the task execution result;
adding the first task to the third queue after the first thread quits executing the first task; and
using a second thread to execute the first task in the second queue after the first task receives the task execution result,
wherein the second thread is in the N threads and has completed a task in a corresponding task queue.

7. The method according to claim 2, wherein:
the plurality of tasks comprises a first task belonging to a second queue,
the first task, when executed by a first thread, waits for a task execution result of a third queue,
the first thread is in the N threads and is configured to execute tasks in the second queue,
the second queue is in the waiting queue group,
the third queue is in the waiting queue group and is different from the second queue, and
the method further comprises:
making the first thread quit executing the first task that is waiting for the task execution result;
adding the first task to the third queue after the first thread quits executing the first task; and
using a second thread to execute the first task in the second queue after the first task receives the task execution result,
wherein the second thread is in the N threads and is made to quit executing a task in a corresponding task queue.

8. The method according to claim 2, wherein the method further comprises:
deleting, from the waiting queue group, a task queue in which a task is performed by at least one of the N threads.

9. A task scheduling apparatus, comprising:
a memory configured to store computer-executable instructions; and
one or more processors configured to execute the computer-executable instructions stored in the memory to cause the task scheduling apparatus to perform the steps of:
adding, according to a correspondence between a plurality of tasks and M data blocks accessed by the plurality of tasks, each task of the plurality of tasks to one of M task queues associated with a data block that corresponds to the task being added, wherein the M data blocks correspond one-to-one to the M task queues; and
executing N threads to concurrently perform tasks in N task queues of the M task queues, wherein each of the N threads executes a task in one task queue of the N task queues, different threads of the N threads execute tasks in different task queues, and $2 \leq N \leq M$.

10. The apparatus according to claim 9, wherein the steps further comprise:
adding at least one of the M task queues to a waiting queue group, wherein each of the at least one of the M task queues comprises at least one task that has not been executed by a thread of the N threads,
wherein the waiting queue group stores at least one task queue of the M task queues according to a first-in-first-out (FIFO) rule.

11. The apparatus according to claim 10, wherein the executing N threads to concurrently perform the tasks in the N task queues of the M task queues comprises:
executing the N threads to perform tasks in first N task queues in the waiting queue group concurrently,
wherein the first set of task queues include N task queues that are first added to the waiting queue group, and each of the N threads performs a task in a corresponding task queue of the first set of task queues according to the FIFO rule.

12. The apparatus according to claim 11, wherein the steps further comprise:
using an idle thread to perform a task in a first queue in the waiting queue group, wherein the first queue is a task queue that is added to the waiting queue group after the first set of task queues; and
deleting the first queue from the waiting queue group,
wherein the idle thread is a thread that is in the N threads and that has completed a task in a corresponding task queue.

13. The apparatus according to claim 11, wherein the steps further comprise:
using an idle thread to perform a task in a first queue in the waiting queue group, wherein the first queue is a task queue that is added to the waiting queue group after the first set of task queues; and
deleting the first queue from the waiting queue group,
wherein the idle thread is a thread that is in the N threads and that is made to quit executing a task in a corresponding task queue.

14. The apparatus according to claim 10, wherein:
the plurality of tasks comprises a first task belonging to a second queue,
the first task, when executed by a first thread, waits for a task execution result of a third queue, the first thread is in the N threads and configured to execute tasks in the second queue, the second queue is in the waiting queue group, the third queue is in the waiting queue group and different from the second queue, and the method further comprises:

making the first thread quit executing the first task that is waiting for the task execution result;

adding the first task to the third queue after the first thread quits executing the first task; and using a second thread to execute the first task in the second queue after the first task receives the task execution result, wherein the second thread is in the N threads and has completed a task in a corresponding task queue.

15. The apparatus according to claim 10, wherein:

the plurality of tasks comprises a first task belonging to a second queue, the first task, when executed by a first thread, waits for a task execution result of a third queue, the first thread is in the N threads and configured to execute tasks in the second queue, the second queue is in the waiting queue group, the third queue is in the waiting queue group and is different from the second queue, and the method further comprises:

making the first thread quit executing the first task that is waiting for the task execution result;

adding the first task to the third queue after the first thread quits executing the first task; and using a second thread to execute the first task in the second queue after the first task receives the task execution result, wherein the second thread is in the N threads and is made to quit executing a task in a corresponding task queue.

16. A non-transitory computer-readable medium storing computer instructions that, when executed by one or more processors, cause the one or more processors to perform task scheduling by performing the steps of:

adding, according to a correspondence between a plurality of tasks and M data blocks accessed by the plurality of tasks, each task of the plurality of tasks to one of M task queues associated with a data block that corresponds to the task being added, wherein the M data blocks correspond one-to-one to the M task queues; and executing N threads to concurrently perform tasks in N task queues of the M task queues, wherein each of the N threads executes a task in one task queue of the N task queues, different threads of the N threads execute tasks in different task queues, and $2 \leq N \leq M$.

17. The computer-readable medium according to claim 16, wherein the steps further comprise:

adding at least one of the M task queues to a waiting queue group, wherein each of the at least one of the M task queues comprises at least one task that has not been executed by a thread of the N threads, wherein the waiting queue group stores at least one task queue of the M task queues according to a first-in-first-out (FIFO) rule.

18. The computer-readable medium according to claim 17, wherein the executing the N threads to concurrently perform the tasks in the N task queues of the M task queues comprises:

executing the N threads to concurrently perform tasks in first set of task queues in the waiting queue group, wherein the first set of task queues includes N task queues that are first added to the waiting queue group, and each of the N threads performs a task in a corresponding task queue of the first set of task queues according to the FIFO rule.

19. The computer-readable medium according to claim 18, wherein the steps further comprise:

using an idle thread to perform a task in a first queue in the waiting queue group, wherein the first queue is a task queue that is added to the waiting queue group after the first set of task queues; and deleting the first queue from the waiting queue group, wherein the idle thread is a thread that is in the N threads and that has completed a task in a corresponding task queue.

20. The computer-readable medium according to claim 18, wherein the steps further comprise:

using an idle thread to perform a task in a first queue in the waiting queue group, wherein the first queue is a task queue that is added to the waiting queue group after the first set of task queues; and deleting the first queue from the waiting queue group, wherein the idle thread is a thread that is in the N threads and that is made to quit executing a task in a corresponding task queue.

\* \* \* \* \*